(12) United States Patent
Richardson et al.

(10) Patent No.: US 6,305,472 B2
(45) Date of Patent: *Oct. 23, 2001

(54) CHEMICALLY ASSISTED THERMAL FLOOD PROCESS

(75) Inventors: William C. Richardson, Bellaire; Kenneth R. Kibodeaux, Katy, both of TX (US)

(73) Assignee: Texaco Inc., White Plains, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,218

(22) Filed: Nov. 20, 1998

(51) Int. Cl.$^7$ ............... E21B 43/16; E21B 43/24
(52) U.S. Cl. ............... 166/305.1; 166/272.1; 166/303; 166/263
(58) Field of Search ............... 166/272.1, 272.6, 166/303, 263, 272.4, 305.1

(56) References Cited

U.S. PATENT DOCUMENTS

| | | | |
|---|---|---|---|
| 2,742,089 | 4/1956 | Morse et al. | 166/400 |
| 3,608,638 | 9/1971 | Terwilliger | 166/270.2 |
| 3,977,471 | 8/1976 | Gale et al. | 166/270.1 |
| 4,004,636 | 1/1977 | Brown et al. | 166/401 |
| 4,018,278 | 4/1977 | Shupe | 166/252.1 |
| 4,109,720 | 8/1978 | Allen et al. | 166/269 |
| 4,113,632 | 9/1978 | Stournas et al. | 507/244 |
| 4,175,618 * | 11/1979 | Wu et al. | 166/270.1 |
| 4,212,353 * | 7/1980 | Hall | 166/303 |
| 4,549,608 | 10/1985 | Stowe et al. | 166/280 |
| 4,582,138 * | 4/1986 | Balzer | 166/270.1 |
| 4,629,000 | 12/1986 | Hurd | 166/270.1 |
| 4,688,637 * | 8/1987 | Theis | 166/245 |
| 4,706,749 * | 11/1987 | Hayes et al. | 166/267 |
| 4,844,158 | 7/1989 | Jennings, Jr. | 166/267 |
| 4,899,817 | 2/1990 | Djabbarah | 166/252.1 |
| 5,271,463 | 12/1993 | Jennings, Jr. | 166/271 |
| 5,333,687 | 8/1994 | Osterloh | 166/272.4 |

FOREIGN PATENT DOCUMENTS

| | | |
|---|---|---|
| 1018058 | 9/1977 | (CA) . |
| 1027851 | 3/1978 | (CA) . |

OTHER PUBLICATIONS

Kirk and Othmer, *Encyclopedia of Chemical Technology*, Fourth Edition vol. 9, p. 393–397, (undated).

Torlief Holt and Frode Vassenden, *Foam in reservoir engineering*, May 20, 1998, 2 pages, www.iku.sintef.no/Restek/ Research activities/flow–control/Foam.Foam.htm.

Jack H. Bayless, *Hydrogen Peroxide: A New Thermal Stimulation Technique*, World Oil, May 1988, pp. 75–78.

H.L. Hoffman, *Petroleum and Its Products*, Riegel's Handbook of Industrial Chemistry, Ninth Edition, p. 480, 488–489, (undated).

Kirk and Othmer, *Encyclopedia of Chemical Technology*, Fourth Edition, vol. 18, p. 342–344, 433–437, (undated).

\* cited by examiner

Primary Examiner—David Bagnell
Assistant Examiner—Jennifer Dougherty
(74) Attorney, Agent, or Firm—Morris N. Reinisch; Howrey Simon Arnold & White

(57) ABSTRACT

An enhanced oil recovery process uses an injectant containing water and an additive. The additive is an organic compound having a total of 1 to 10 carbons and at least one functional group containing a heteroatom. The additive is present at a concentration of between about 0.01% and about 20% by weight of the composition. The injectant is injected at a temperature of between about 100° F. to about 500° F. Hot water flooding with the additive provides enhanced oil recovery in medium to heavy oil reservoirs.

28 Claims, 2 Drawing Sheets

CHEMICALLY ASSISTED THERMAL FLOOD PROCESS

BACKGROUND OF THE INVENTION

1. Field of the Invention

This invention relates to the field of crude oil production. Particularly, the invention relates to enhanced oil recovery in medium to heavy oil reservoirs by thermal flooding.

2. Description of Related Art

Heavy crude oil reservoirs are generally more difficult to develop than reservoirs of lighter crude oil. Heavy petroleum deposits contain crude oil of relatively high density. The density of a crude oil is generally represented by its API gravity—defined by the American Petroleum Institute (API) as $°API=[141.5/\text{specific gravity}]-131.5$, where the specific gravity is measured at 60° F. Crude oil produced from heavy crude oil deposits generally have an average API gravity of 25 or less; from medium deposits, 30 or less. API gravity is inversely proportional to density: the higher the API gravity, the lower the density. Lower density is generally associated with higher viscosity, i.e., greater resistance to flow. Heavier crude oil deposits—having high viscosity—do not flow readily and are difficult to develop. This raises production costs.

Researchers therefore seek methods of improving recovery of heavy petroleum deposits. Crude oil is held in a reservoir by viscous forces (resistance to flow) and capillary forces. Viscous forces predominate in heavy oil reservoirs. Heavy oil reservoir enhanced recovery processes generally focus on reducing viscosity to improve oil mobility.

Hot water flooding is an enhanced recovery process that uses heat to improve conventional water flooding. The higher temperature lowers the viscosity of the heavy oil; the oil then flows more easily to the production well. Hot water flooding is generally inefficient and unpopular. Steam flooding is another recovery process that is used to improve conventional flooding. But steam flooding is not suitable for some heavy oil reservoirs, e.g., where: (1) the heavy oil is of very high viscosity, (2) the reservoir is at too high a pressure to develop a steam gas phase, or (3) the formation of a steam chest is undesirable for environmental reasons. This has made the process less popular for oil recovery.

Solvent-in-water injection is another enhanced recovery process. This process seeks to improve recovery efficiency by lowering capillary forces. Solvent is injected into a reservoir as a slug—a discrete volume of fluid of composition different from the injection fluid. The solvent slug mixes with water and oil and displaces both. This process uses solvents mutually soluble in water and oil to effect a miscible to nearly-miscible type displacement process in light to medium oil reservoirs (>25° API). U.S. Pat. No. 4,629,000 discloses injecting a slug containing an oil-soluble alcohol of 5 to 7 carbon atoms and an oil-soluble sulfate or sulfonate surfactant. The injection fluid is not heated.

Yet another enhanced recovery process is aromatic hydrocarbon injection. U.S. Pat. No. 3,608,638 discloses a method to enhance oil recovery from tar sands using hot hydrocarbon solvents. The solvents are injected at temperatures between 300° F. and 700° F. Preferred solvents are aromatic hydrocarbons. U.S. Pat. No. 4,004,636 and U.S. Pat. No. 4,109,720 disclose petroleum recovery methods using multiple-component solvent injection.

Laboratory studies performed using the methods described above showed that oil recoveries declined as the oil gravity decreased and viscosity increased. This suggests that these process are not suitable for heavy oil recovery. Additionally, solvent injection processes are costly, since large amounts of relatively expensive solvent are consumed.

Another conventional process improves recovery by including surfactants in a water injection process. As with solvent slug processes, a disadvantage is higher cost. U.S. Pat. No. 3,977,471 discloses an oil recovery method using an injection fluid containing brine, a sulfonate surfactant, and an alcohol co-surfactant. The process is not carried out at elevated temperature, since the surfactants lose surface activity under reservoir conditions of high temperature (120° F. or more). The process uses alcohols as co-surfactants to improve surface activity in brine of high salinity. U.S. Pat. No. 4,018,278 addresses the problem of temperature instability of salts of polyethoxylated alcohols, polyethoxylated alkylphenols and alkylphenol sulfates, and the problem of poor performance of alkyl and alkylaryl sulfonates in water of high salinity, by using sulfonated, ethoxylated alcohols or alkylphenols having alkyl or alkylaryl groups of 8 to 20 carbons. These processes all suffer the disadvantage of requiring costly surfactants.

Carbon dioxide flooding is another conventional process for improved crude oil recovery. U.S. Pat. No. 4,899,817 discloses the use of alcohol in solvent flooding by carbon dioxide. To reduce the cost of the process, a slug of carbon dioxide and alcohol is injected, followed by injection of water. The alcohol reportedly increases the viscosity and density of the carbon dioxide. The process is not simple—it requires careful control of pressure to maintain the carbon dioxide under supercritical conditions. U.S. Pat. No. 5,333,687 discloses carbon dioxide flooding with a surfactant foaming agent and alcohols of 8 to 20 carbons. Alcohols of fewer than 8 carbons are discouraged as having less interfacial activity, The added alcohol allows cost reduction by replacing the expensive surfactant foaming agent. But surfactant must still be present in an alcohol/surfactant ratio of at least 1:2.

Therefore, there is a need in the art for a lower cost process that improves the efficiency of oil recovery. Particularly, there is a need for a more cost effective hot water flooding process that improves the efficiency of oil recovery, especially the recovery of heavy oils. A process is therefore sought to enhance at lower cost the efficiency of oil recovery by hot water flooding. The present invention, for which a full description is presented below, solves the need in the art for such a process.

SUMMARY OF THE INVENTION

Applicants have discovered an improved water flooding process for enhanced recovery of medium to heavy oil. The process involves using an injectant containing an additive. The additive reduces interfacial tension (IFT) between water and oil. Surprisingly, the additive is of relatively low molecular weight compared to conventional additives, e.g., surfactants. The new oil recovery process increases oil recovery at lower cost than water flooding with conventional additives.

The additive contains 1 to 10 carbons and at least one heteroatom, and includes oxygen-containing hydrocarbons, nitrogen-containing hydrocarbons (including amination products of hydrocarbons), and sulfur-containing hydrocarbons. The use of these substances in hot water floods has not been suggested in the past, particularly in the absence of surfactants. The additive enhances the effect of elevated temperature, and thus further reduces final oil saturation and increases recovery efficiency of water flooding.

In one aspect, the process of the present invention for increasing recovery of oil from an oil reservoir comprises the steps of:

a) heating an injectant to a temperature of between about 100° F. to about 500° F., wherein the injectant comprises:

i) water, and ii) an additive present at a concentration of between about 0.01% and about 20% by weight of the composition, wherein the additive is an organic compound having a total of 1 to 10 carbons and at least one functional group containing a heteroatom; and b) injecting the heated injectant as a liquid into an oil reservoir.

In a further aspect, the present invention provides a crude oil obtained by an oil recovery process comprising the steps of:

a) heating an injectant to a temperature of between about 100° F. to about 500° F., wherein the injectant comprises:

i) water, and ii) an additive present at a concentration of between about 0.01% and about 20% by weight of the composition, wherein the additive is an organic compound having a total of 1 to 10 carbons and at least one functional group containing a heteroatom;

b) injecting the heated injectant as a liquid into an oil reservoir; and c) extracting crude oil from the oil reservoir.

FEATURES AND ADVANTAGES

The present invention has a number of features and advantages which distinguish it over conventional processes for increasing the recovery of medium to heavy oil.

An advantage of the present invention is its suitability for medium to heavy oil reservoirs found at depths of greater depths, typically over 5,000 feet. In such reservoirs, high reservoir pressure and heat losses render steam injection impractical.

Another advantage of the present invention is its suitability in environmentally sensitive reservoirs. For example, conventional steam flooding promotes formation of hydrogen sulfide in deposits containing oil rich in sulfides. The PNZ Wafra Field 1st Eocene reservoir in Kuwait is such an oil field, where steam flooding would be environmentally undesirable due to potential generation of hydrogen sulfide. This problem is less pronounced with hot water flooding.

Still another advantage is viscous force reduction and interfacial tension reduction in heavy oil recovery.

Additional features and advantages of the present invention will become apparent from the following description, and may be realized by means of the instrumentalities and combinations particularly pointed out in the appended claims.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

The process of the present invention is directed to increasing crude oil development from a subterranean formation containing organic deposits. These formations may be petroleum reservoirs. The formations are porous; petroleum occupies the space formed by the pores.

An injection well and a production well generally extend into the petroleum reservoir. Location, number, and depth of injection and production wells can vary depending on the particular well being developed. Injection—carried out at the injection well—is the introduction of injectant into the reservoir to displace crude oil towards the production well. Production—carried out at the production well—is the collection of crude oil emerging from the reservoir.

The inventors have unexpectedly found that oil production can be increased by including a particular additive in the injectant of a hot water flooding process. The additive is an organic compound having a total of 1 to 10 carbons and at least one functional group containing a heteroatom.

Unless indicated otherwise, percentages represent percent by weight.

Process of the Present Invention

Figure 1:
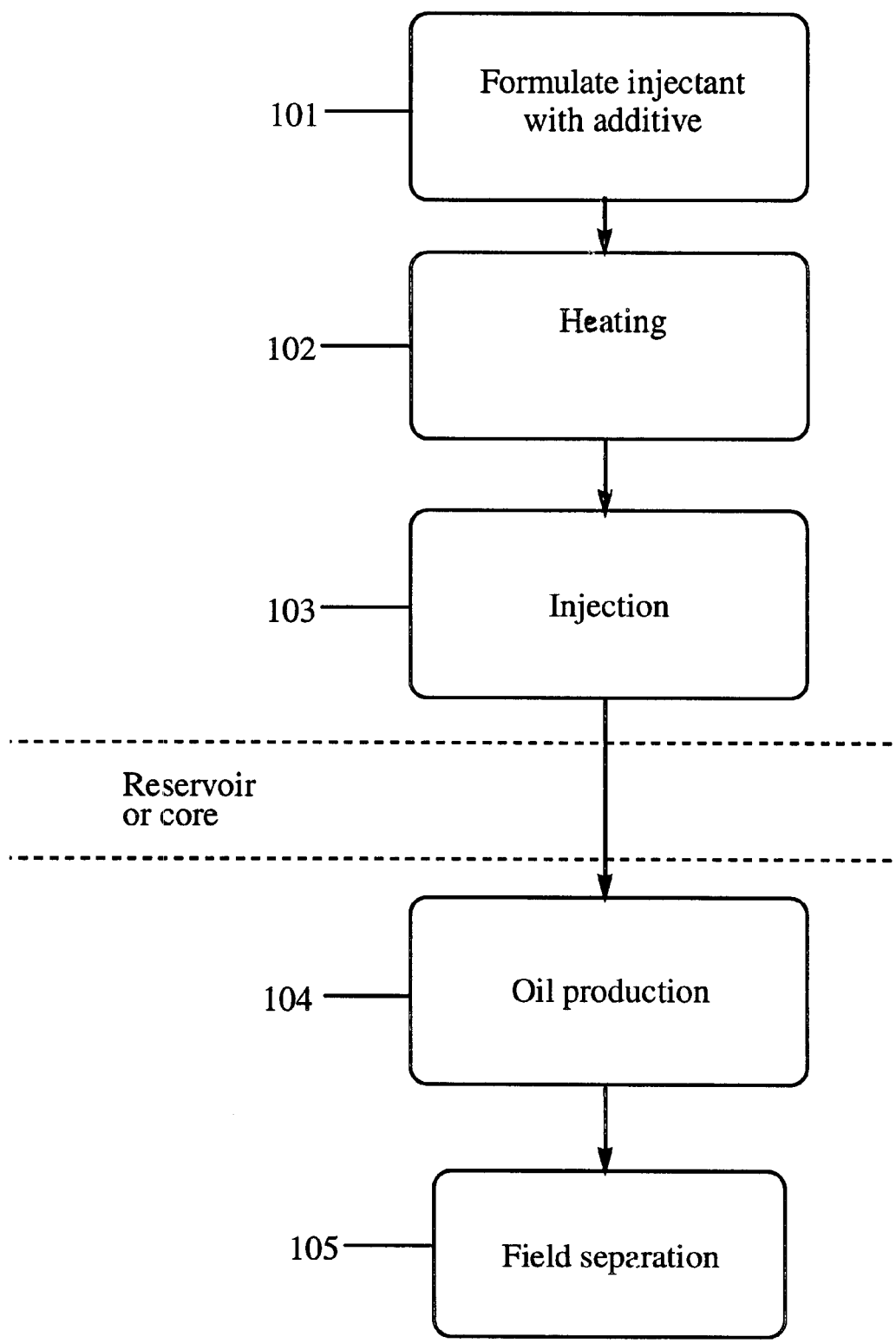
FIG. 1 shows a flow diagram illustrating one embodiment of a process for increasing recovery of oil from an oil reservoir according to the present invention.

With reference now to the drawings, FIG. 1 illustrates one embodiment of a process for increasing oil recovery in accordance with the present invention.

In a step 101, an injectant is formulated by combining an additive with water or brine. This step may occur at any time prior to injection, and need not immediately precede injection.

The injectant comprises water and an additive. The additive may be an organic compound having a total of 1 to 10 carbons and at least one functional group containing a heteroatom. The heteroatom is preferably oxygen, nitrogen, or sulfur, more preferably oxygen. Examples of the functional group include, but are not limited to hydroxy, primary amino, secondary amino, carboxy, sulfoxide, sulfate, and sulfonate. Preferably, the additive will contain a total of 1 to 6 carbons. More preferably, the additive is an alcohol of 3 to 5 carbons. Even more preferably, the additive is an alcohol of 4 carbons, e.g., n-butanol, iso-butanol, sec-butanol, or tert-butanol.

Examples of alcohols that may be used as the additive include, but are not limited to methanol, ethanol, and isomers of propanol, butanol, pentanol, and hexanol, e.g., n-propanol, iso-propanol, n-butanol, isobutanol, tert-butanol, sec-butanol, and isomers of pentanol, e.g., n-pentanol, isopentanol, neopentanol, and tert-amyl alcohol.

The additive may also contain two or more functional groups, e.g., an alkanolamine having an amino group and a hydroxy group. An example of such an additive includes, but is not limited to, ethanolamine.

Preferably, the additive is soluble in water or brine to at least about 0.1% by weight, more preferably at least 1%, even more preferably at least 5%.

Preferably, the additive is present in the composition at a concentration of between about 0.01% and about 20% by weight, more preferably about 0.1% to about 15%, even more preferably about 1% to about 10%.

The water may be from conventional sources, including well water, water from aquifers, tap water, or sea water. The water may also be a brine such as natural brine or synthetic brine. The salt concentration of the brine may be anywhere from about zero to nearly saturated or completely saturated. The water may be a diluted brine, i.e., diluted with water.

Surfactants need not be present in the injectant to achieve enhanced oil recovery. The process provides enhanced oil recovery with an injectant which is essentially free or substantially free of surfactant. Conventional surfactants are anionic, cationic, amphoteric, or nonionic molecules of over 10 carbons. Examples of anionic surfactants include petroleum sulfates and sulfonates, alkyl sulfates and sulfonates, aryl sulfates and sulfonates, and salts of polyethoxylated alcohols. Examples of cationic surfactants include alkylpyridinium salts and quaternary ammonium salts. Examples of nonionic surfactants include polyethoxylated alkyl phenols and polyethoxylated aliphatic alcohols. Small amounts of surfactants may be present. For example, the amount of surfactant may be less than about 1%, or even less than about 0.01%.

In a second step 102 of the process, the injectant is heated to a temperature of at least 100° F., preferably between about 120° F. and about 500° F. The optimal temperature will vary depending on the particular characteristics of the deposit. Preferably, the injectant is heated to a temperature of between about 200° F. and about 300° F., more preferably between about 220° F. and about 270° F.

In a third step 103 of the process, the heated injectant is injected into the petroleum reservoir in a manner well-known to one of skill in the relevant art.

In a fourth step 104 of the process, crude oil may be developed at the production well in a manner well-known to one of skill in the relevant art.

In a fifth step 105 of the process, the developed crude oil may be subjected to a field separation step. Field separation involves separating gases, water, or dirt from the oil, e.g., by action of gravity in a settling tank or by some other separation process. Such a separation step may be carried out at or near the production well, or may be carried out at another location, or may be omitted.

The process of the present invention is suitable for extraction of oil deposits of medium to heavy oils, e.g., oils of less than about 30° API. The process is particularly advantageous for oil deposits of less than about 25° API, or even less than about 20° API. The process is also suitable for heavy oil deposits of about 15° API or less.

The process is suitable for injection and production wells created by any known drilling methods, including vertical, horizontal, and directional drilling. Injection may be continuous or non-continuous, preferably continuous.

Exemplary processes are described in the following Examples. After reading this description, it will become apparent to a person skilled in the art how to implement the invention by varying the identity and amount of additive and the heating temperature.

EXAMPLES

Oil samples used hereinafter are from automatic well test site 6 (AWT 6). AWT 6 oil is close in properties to oil from Station 36. Station 36 oil is generally accepted as representative of oil produced from the Kern River Field, California. This 13° API Kern River oil is considered by those skilled in the art to be representative of heavy oil. The Kern River Field is considered by those skilled in the art to be a representative heavy oil reservoir.

Physical Properties of Fluids

Measurements of physical properties of fluids were conducted in Kern River synthetic brine and a Kern River oil sample. The synthetic brine was made to a composition to closely match average brine produced from the Kern River Field, California. The oil sample was collected from the Station 36 gathering system and cleaned by vacuum assisted roto-evaporation and filtration to remove water and sediment. The additives studied included $C_4$ and $C_5$ alcohols. The former included n-butanol, sec-butanol, tert-butanol; the latter, n-pentanol and tert-amyl alcohol (also known as 2-methyl-2-butanol and dimethylethylcarbinol). Fluid properties of the oil, synthetic brine, and additives are summarized in Table 1. Viscosity is measured in units of centipoise (cp).

TABLE 1

Physical Properties of Fluids

| Sample | Boiling Point(° F.) | Density (g/cc$^a$) | Gravity (° API) | Molecular Weight | Viscosity (cp$^a$) |
|---|---|---|---|---|---|
| AWT 6 oil | >600 | | 13.0 | 458 | 10000 |
| synthetic brine | 212 | 1.0 | 10.0 | 18 | 1.112 |
| n-butanol | 243 | 0.8098 | | 74.12 | |
| sec-butanol | 211 | 0.808 | | 72.12 | |
| tert-butanol | 181 | 0.7887 | | 72.12 | |
| n-pentanol | 298 | 0.831 | | 88.15 | |
| tert-amyl alcohol | 215 | 0.809 | | 88.15 | |
| Ethanolamine | 342 | 1.018 | | 61.08 | |

$^a$Measurements at room temperature (75° F.)

Injectant Properties

Densities and viscosities of injectants at ambient conditions are summarized in Table 2. The brine used is Kern River synthetic brine. Adding 5% alcohol to the brine in some cases increased the brine viscosity by 18% at room temperature.

TABLE 2

Physical Properties of Injectants.

| Sample | % in Brine | Density (g/cc$^a$) | Viscosity (cp$^a$) |
|---|---|---|---|
| brine | — | 0.9961 | 1.112 |
| Ethanolamine | 5 | 0.9967 | 1.070 |
| n-butanol | 5 | 0.9874 | 1.301 |
| sec-butanol | 5 | 0.9880 | 1.321 |
| tert-butanol | 5 | 0.9872 | 1.301 |
| n-pentanol | 0.1 | 0.9953 | 1.095 |

$^a$Measurements at room temperature (75° F.)

Interfacial Tension

Oil-water interfacial tension measurements were conducted for combinations of Kern River oil and injectants with and without additives. Houston tap water was used. Because of its high viscosity, the Kern River heavy oil was diluted with kerosene to facilitate measurements. Interfacial tension measurements were conducted using a Du Nouy ring tensiometer. Measurements were carried out at room temperature (75° F.). At least five measurements were averaged to a final reportable value. The results are summarized in Table 3. The injectants containing an additive reduced interfacial tension relative to the injectant containing no additive.

TABLE 3

Interfacial Tension Between Injectants and Oil/Kerosene Mixture.

| Additive | Concentration (% w/w) | Interfacial Tension[a] (dynes/cm) |
|---|---|---|
| no additive | 0 | 25.3 |
| n-butanol | 1% | 21.8 |
| sec-butanol | 1% | 22.2 |
| methanol | 1% | 25.2 |
| ethanolamine | 10% | 0.27 |
| n-butanol | 10% | 15.1 |
| sec-butanol | 10% | 9.07 |
| methanol | 10% | 24.03 |

[a]Measurements at room temperature (75° F.)

Example

A series of hot water floods was conducted with injectants at 0% to 5% additive concentration. The floods were carried out on cores made out of an average 95 mesh α-quartz (Federal 95 sand) having a nominal permeability of 5 darcies. An apparatus for carrying out this embodiment of the process of the present invention on a sand pack model is shown in FIG. 2.

Initial oil saturation ($S_{oi}$) and final oil saturation ($S_{of}$) were obtained by volumetric measurements based on pore volume ($V_p$). The core is a porous material. One pore volume is defined as the total free volume within the pores of the porous core material. The pore volume therefore represents the total available volume within the core that could be filled with oil. Saturation is defined as the ratio of the volume of oil to one pore volume, i.e., the ratio of the volume occupied by the oil in the core to the total available volume in the core. Pore volume was determined by weighing the core empty, filling the core with a liquid, then weighing the filled core; the pore volume was calculated from the difference of the filled and empty weights, based on the density of the liquid. Pore volume throughput (PV) is a dimensionless measure of the ratio of injectant volume passed through a formation relative to the pore volume.

The core was evacuated, saturated with Kern synthetic brine, and oil flooded. Back pressure was used to ensure that the fluids remain liquid phase. Hot-water injection was terminated after 10–12 pore volumes of throughput (PV). At the start of each core flood, the core pack was generally at an initial oil saturation ($S_{oi}$) of about 80%. Simple hot water floods at 250° F. with no additive reduced the saturation to a final oil saturation ($S_{of}$) of about 28%. When additive was present, $S_{of}$ was even lower.

Figure 2:
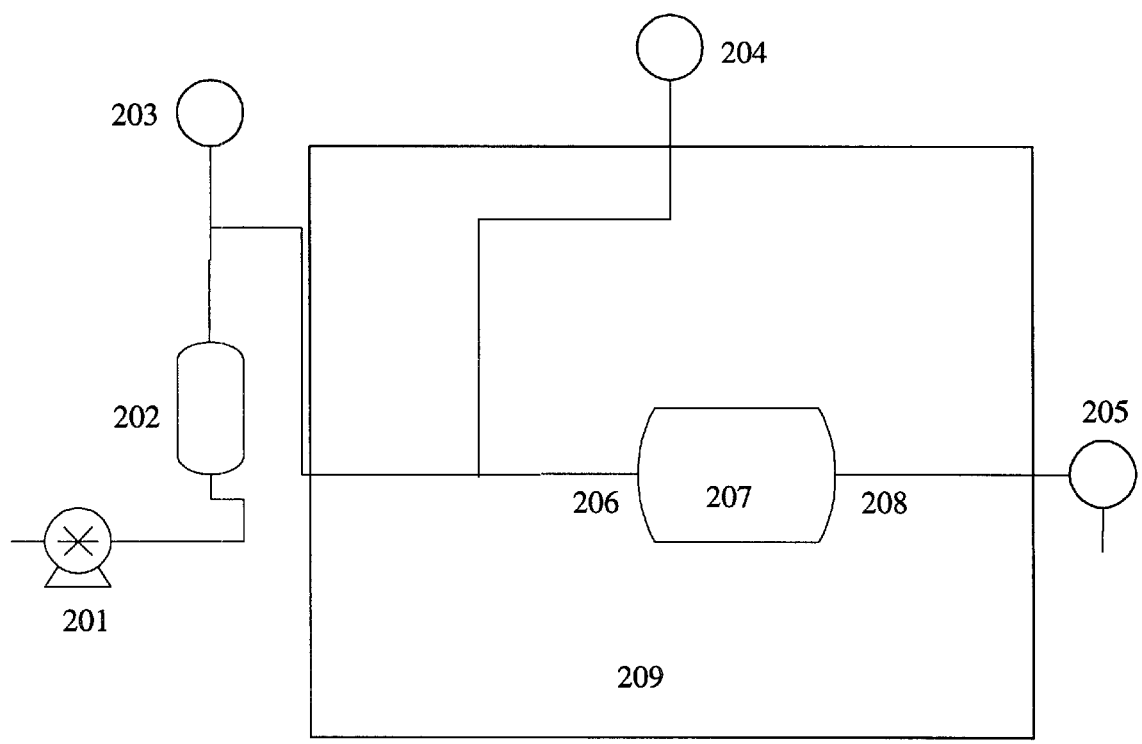
FIG. 2 shows a schematic representation of an apparatus for carrying out an embodiment of the process of the present invention on a sand pack model.

Referring to FIG. 2, the following procedure was followed for each core flood:

The pack is prepared in fluorated ethylene propylene (FEP) heat shrink tubing. The length, diameter, and weight of the pack is measured. The pack is mounted in a Viton sleeve, then into a triaxial Temco cell to provide sand pack model 207.

400 psig overburden pressure is applied to sand pack model 207, which is then evacuated for 1 hour, then weighed. Sand pack model 207 is saturated with brine using a pump 201 that measures volume, then weighed and packed again. Sand pack model 207 is placed in oven 209, lines are attached, and brine as injectant is flowed through 207 to measure permeability.

In the apparatus, injectant is loaded into isolation cylinder 202. Water is pumped by pump 201, driving injectant from isolation cylinder 202. The injectant passes through injector 206, sand pack model 207, producer 208, and back pressure regulator 205. Injector 206 and producer 208 respectively correspond to the injection well and production well in an actual production facility. Injection pressure is slightly greater than 60 psig, as measured by injection pressure meters 203 and 204, such that the pressure differential AP between injection pressure and back pressure ranges from 0–6 psi.

Oven 209 is set at 250° F. Overburden pressure is set at 460 psig. Back pressure is set at 60 psig at back pressure regulator 205. Brine is flowed through 207 overnight at 0.1 ml/min.

On the second day, overburden is still at 460 psig and back pressure is still at 60 psig. Oil flooding is carried out at 2.0 ml/min. Two pore volumes are injected, and injection pressure is noted to ascertain oil permeability.

On the third day, overburden is still at 460 psig and back pressure is still at 60 psig. Waterflooding with injectant is carried out at 2.0 ml/min. Production is carried out into tubes. Increasingly larger volumes are collected into subsequent tubes as oil volume decreases. The tubes are heated at about 140° F. and centrifuged for 15 minutes. A measured amount of xylene is added as needed to each tube, the contents are mixed by vibrating or shaking by hand, and centrifuged. The xylene volume is subtracted to get the true total volume. Water volume is read and recorded, and subtracted from the true total volume to get oil volume. Results are shown in Table 4 below.

TABLE 4

Oil Displacements at 250° F.

| Additive | Concentration (% w/w) | Pore Volume ($V_p$) | Initial Oil Saturation ($S_{oi}$) | Final Oil Saturation ($S_{of}$) |
|---|---|---|---|---|
| none | — | 11.72[a] | 80.7[a] | 27.6[a] |
| 5% EtAm | 5% | 11.57 | 82.6 | 40.6 |
| n-butanol | 5% | 12.08 | 82.7 | 13.8 |
| n-butanol | 1% | 12.46 | 79.7 | 14.5 |
| n-butanol | 0.1% | 11.69 | 80.4 | 27.2 |
| sec-butanol | 5% | 12.23 | 84.3 | 13.7 |
| tert-butanol | 5% | 12.83 | 82.6 | 12.7 |
| tert-butanol | 1% | 12.49 | 81.2 | 24.1 |
| tert-butanol | 0.1% | 12.32 | 81.7 | 25.1 |
| n-pentanol | 0.1% | 12.35[b] | 79.7[b] | 25.5[b] |
| tert-amyl alcohol | 0.1% | 11.88[c] | 83.4[c] | 22.6[c] |

[a]Average of four measurements.
[b]Average of two measurements.
[c]Average of three measurements.

The data in Table 4 shows that injectants containing additive provide increased oil recovery over the injectant with no additive. While the injectant with no additive provided an average $S_{of}$ of 27.8, the value is greater for injectants containing additive, particularly for injectants containing higher concentrations of additive.

As seen from the data in Table 4, core floods with injectants containing $C_4$ alcohols (n-butanol, sec-butanol, and tert-butanol) at a 5% additive concentration provide substantially greater recovery compared to the base hot-water floods with no additive. Similarly, other relatively small molecules with polar functional groups are expected to provide improved recovery. Such molecules may have between 1 and 10 carbons and at least one polar functional group—particularly a functional group having a heteroatom—and are capable of lowering water-oil interfacial tension.

Only one hot water flood was conducted with ethanolamine as additive. A 5% ethanolamine hot water flood recovered less oil than the base floods: the final oil saturation after injection of 11 pore volume throughput (PV) of 5% ethanolamine was 40%, while the average of the baseline hot-water flood residuals was 28%. This result appears to be due to undesirable emulsion formation or plugging, based on the observed change in pressure drop between the injection well and the production well. Absent the emulsion formation or plugging, it is expected that ethanolamine will increase oil recovery in the process of the present invention. Normally, the pressure drop between the injection well and the production well decreases rapidly during the flooding process from a maximum at the start of injection, leveling off to a minimum after the initial drop. Initially, the pressure drop is at a maximum due to back pressure from the immobile deposit. As the flow rate at the production well increases, the pressure drop decreases, eventually reaching a minimum. During the ethanolamine flood, the pressure drop between the injection well and the production well declined up until water breakthrough (emergence of injectant from the production well), and then unexpectedly increased. As the pressure drop increased, the flow rate of oil slowed, ultimately reducing the amount of produced crude oil.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A process for increasing recovery of oil from an oil reservoir, comprising the steps of:
    heating an injectant to a temperature of between about 220° F. to about 500° F., wherein the injectant comprises,
        i) water, and
        ii) an additive present at a concentration of between about 0.01% and about 20% by weight of the composition, wherein the additive is an organic compound having a total of 1 to 10 carbons and at least one functional group containing oxygen or sulfur; and
    injecting the heated injectant as a liquid into the oil reservoir such that said injectant does not result in emulsion formation upon injection into the oil reservoir.

2. The process of claim 1, wherein the functional group is selected from the group consisting of hydroxy, carboxy, sulfoxide, sulfate, and sulfonate.

3. The process of claim 1, wherein the additive contains 1 to 6 carbons and a single functional group.

4. The process of claim 1, wherein the additive is an alcohol of 3 to 5 carbons.

5. The process of claim 1, wherein the additive is n-butanol, iso-butanol, sec-butanol, or tert-butanol.

6. The process of claim 1, wherein the injectant contains less than about 1% of anionic, cationic, non-ionic or amphoteric surfactants of over 10 carbons.

7. The process of claim 1, wherein the injectant is substantially free of surfactants of over 10 carbons.

8. The process of claim 1, wherein the water is brine.

9. The process of claim 1, wherein the injectant comprises about 0.1% to about 15% by weight of the additive.

10. The process of claim 1, wherein the injectant comprises about 1% to about 10% by weight of the additive.

11. The process of claim 1, further comprising:
    c) extracting crude oil from the oil reservoir via a production well.

12. The process of claim 11, wherein the crude oil extracted from the oil reservoir has an average API gravity of less than about 30° API.

13. The process of claim 11, wherein the crude oil extracted from the oil reservoir has an average API gravity of less than about 20° API.

14. The process of claim 11, further comprising:
    d) separating the crude oil to remove gases, water, or dirt from the crude oil.

15. The process of claim 1, wherein the injectant is heated to a temperature of between about 220° F. to about 300° F.

16. A mixture of crude oil and an injectant obtained by an oil recovery process comprising the steps of:
    a) heating the injectant to a temperature of between about 220° F. to about 500° F., wherein the injectant comprises,
        i) water, and
        ii) an additive present at a concentration of between about 0.01% and about 20% by weight of the injectant, wherein the additive is an organic compound having a total of 1 to 10 carbons and at least one functional group containing oxygen or sulfur;
    b) injecting the heated injectant as a liquid into an oil reservoir wherein said injectant does not result in emulsion formation upon injection into the oil reservoir;
    c) extracting crude oil from the oil reservoir; and
    d) separating gases, water, or dirt from the crude oil.

17. The mixture of claim 16, wherein the functional group is selected from the group consisting of hydroxy, carboxy, sulfoxide, sulfate, and sulfonate.

18. The mixture of claim 16, wherein the additive contains 1 to 6 carbons and a single functional group.

19. The mixture of claim 16, wherein the additive is an alcohol of 3 to 5 carbons.

20. The mixture of claim 16, wherein the additive is n-butanol, iso-butanol, sec-butanol, or tert-butanol.

21. The mixture of claim 16, wherein the injectant contains less than about 1% of anionic, cationic, non-ionic, or amphoteric surfactants of over 10 carbons.

22. The mixture of claim 16, wherein the injectant is substantially free of surfactants of over 10 carbons.

23. The mixture of claim 16, wherein the water is brine.

24. The mixture of claim 16, wherein the injectant comprises about 0.1% to about 15% by weight of the additive.

25. The mixture of claim 16, wherein the injectant comprises about 1% to about 10% by weight of the additive.

26. The mixture of claim 16, wherein the crude oil extracted from the oil reservoir has an average API gravity of less than about 30° API.

27. The mixture of claim 16, wherein the crude oil extracted from the oil reservoir has an average API gravity of less than about 20° API.

28. The mixture of claim 16, wherein the injectant is heated to a temperature of between about 220° F. to about 300° F.

* * * * *